(12) United States Patent
Uesugi et al.

(10) Patent No.: US 10,107,188 B2
(45) Date of Patent: Oct. 23, 2018

(54) FORCED INDUCTION APPARATUS FOR ENGINE

(71) Applicants: KABUSHIKI KAISHA TOYOTA JIDOSHOKKI, Kariya-shi, Aichi-ken (JP); TOYOTA JIDOSHA KABUSHIKI KAISHA, Toyota-shi, Aichi-ken (JP)

(72) Inventors: Tsuyoshi Uesugi, Kariya (JP); Koichi Yonezawa, Toyota (JP)

(73) Assignees: KABUSHIKI KAISHA TOYOTA JIDOSHOKKI, Kariya-shi, Aichi-ken (JP); TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 78 days.

(21) Appl. No.: 15/259,607

(22) Filed: Sep. 8, 2016

(65) Prior Publication Data
US 2017/0074159 A1 Mar. 16, 2017

(30) Foreign Application Priority Data

Sep. 11, 2015 (JP) ................... 2015-179302

(51) Int. Cl.
*F02B 39/14* (2006.01)
*F01D 25/18* (2006.01)
(Continued)

(52) U.S. Cl.
CPC .............. *F02B 39/14* (2013.01); *F01D 25/18* (2013.01); *F01M 11/02* (2013.01); *F02B 37/001* (2013.01);
(Continued)

(58) Field of Classification Search
CPC ..... F01D 25/18; F05D 2220/40; F01M 11/02; F01M 2011/021; F02B 37/001;
(Continued)

(56) References Cited

U.S. PATENT DOCUMENTS 4,982,567 A 1/1991 Hashimoto et al.
2013/0129489 A1* 5/2013 Spix ................... F01M 5/025
415/175

(Continued)

FOREIGN PATENT DOCUMENTS

DE 102010009289 A1 8/2011
DE 102011010995 A1 8/2012
(Continued)

OTHER PUBLICATIONS

Machine Translation DE 10 2011 010 995 Done Jan. 6, 2018.*
Communication dated Feb. 7, 2017 issued by the European Patent Office in corresponding European application No. 16187340.1.

*Primary Examiner* — Patrick Maines
*Assistant Examiner* — Dapinder Singh
(74) *Attorney, Agent, or Firm* — Sughrue Mion, PLLC

(57) ABSTRACT

A forced induction apparatus for an engine includes a first forced induction device including a first bearing and a first oil passage that passes by the first bearing and a second forced induction device including a second bearing, a second oil passage that passes by the second bearing, and a drain passage that is in communication with the first oil passage. The second forced induction device is located below the first forced induction device, and the drain passage receives oil from the first oil passage and discharges the oil out of the second forced induction device.

9 Claims, 2 Drawing Sheets

(51) Int. Cl.
  *F01M 11/02* (2006.01)
  *F02B 37/00* (2006.01)
  *F16C 33/66* (2006.01)
  *F02B 37/007* (2006.01)
  *F02B 37/013* (2006.01)

(52) U.S. Cl.
  CPC .......... *F02B 37/004* (2013.01); *F02B 37/007* (2013.01); *F02B 37/013* (2013.01); *F16C 33/6659* (2013.01); *F16C 33/6685* (2013.01); *F01M 2011/021* (2013.01); *F05D 2220/40* (2013.01); *F16C 2360/22* (2013.01); *Y02T 10/144* (2013.01)

(58) Field of Classification Search
  CPC .... F02B 37/004; F02B 37/007; F02B 37/013; F02B 39/13; F02B 39/14; F01C 33/6659; F01C 33/6685; F01C 2360/22; Y02T 10/144
  USPC .................................................. 60/605.1, 602
  See application file for complete search history.

(56) References Cited

U.S. PATENT DOCUMENTS

| 2013/0269341 | A1  | 10/2013 | Kurata et al. |         |
|--------------|-----|---------|---------------|---------|
| 2014/0056698 | A1* | 2/2014  | Hornbach      | F01D 25/18 |
|              |     |         |               | 415/170.1 |
| 2014/0193244 | A1* | 7/2014  | Koerner       | F01D 25/186 |
|              |     |         |               | 415/170.1 |

FOREIGN PATENT DOCUMENTS

| DE | 102013106228 A1 | 6/2014  |
| JP | 1-195922 A      | 8/1989  |
| JP | 2-132805 U      | 11/1990 |
| JP | 3-95033 U       | 9/1991  |
| JP | 2010255534 A    | 11/2010 |
| JP | 2012-140890 A   | 7/2012  |

\* cited by examiner

FORCED INDUCTION APPARATUS FOR ENGINE

BACKGROUND OF THE INVENTION

The present invention relates to a forced induction apparatus for an engine including forced induction devices arranged next to each other in the vertical direction.

Japanese Laid-Open Patent Publication No. 2012-140890 describes an example of a known forced induction apparatus for an engine including multiple forced induction devices such as a multistage forced induction apparatus. There are various ways to lay out the forced induction devices. However, the forced induction devices are usually laid out in the vertical direction to reduce the occupied area.

The forced induction devices each include a shaft and bearings. The bearings, which rotationally support the shaft, are supplied with oil for lubrication and cooling. The oil supplied to the bearings is returned to an oil pan through a drain pipe, which is arranged below the forced induction device, and supplied again from the oil pan to the forced induction device by a pump. This forms an oil circulation passage.

When the forced induction devices are arranged next to each other in the vertical direction as described above, the space is narrow between the upper forced induction device and the lower forced induction device. Thus, the shape, size, layout, and the like of the drain pipe located below the upper forced induction device are limited. This may hinder smooth discharging of oil from the upper forced induction device and lower the oil discharging efficiency. When the space is widened between the upper forced induction device and the lower forced induction device to arrange the drain pipe below the upper forced induction device in a suitable manner, the volume occupied by the forced induction apparatus increases. This adversely affects the mountability of the forced induction apparatus.

SUMMARY OF THE INVENTION

It is an object of the present invention to provide a forced induction apparatus for an engine including a first forced induction device and a second forced induction device arranged below the first forced induction device that increases the oil discharging efficiency of the first forced induction device without adversely affecting the mountability of the forced induction apparatus.

A forced induction apparatus for an engine that solves the above problem includes a first forced induction device including a first bearing and a first oil passage that passes by the first bearing and a second forced induction device including a second bearing, a second oil passage that passes by the second bearing, and a drain passage that is in communication with the first oil passage. The second forced induction device is located below the first forced induction device, and the drain passage receives oil from the first oil passage and discharges the oil out of the second forced induction device.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
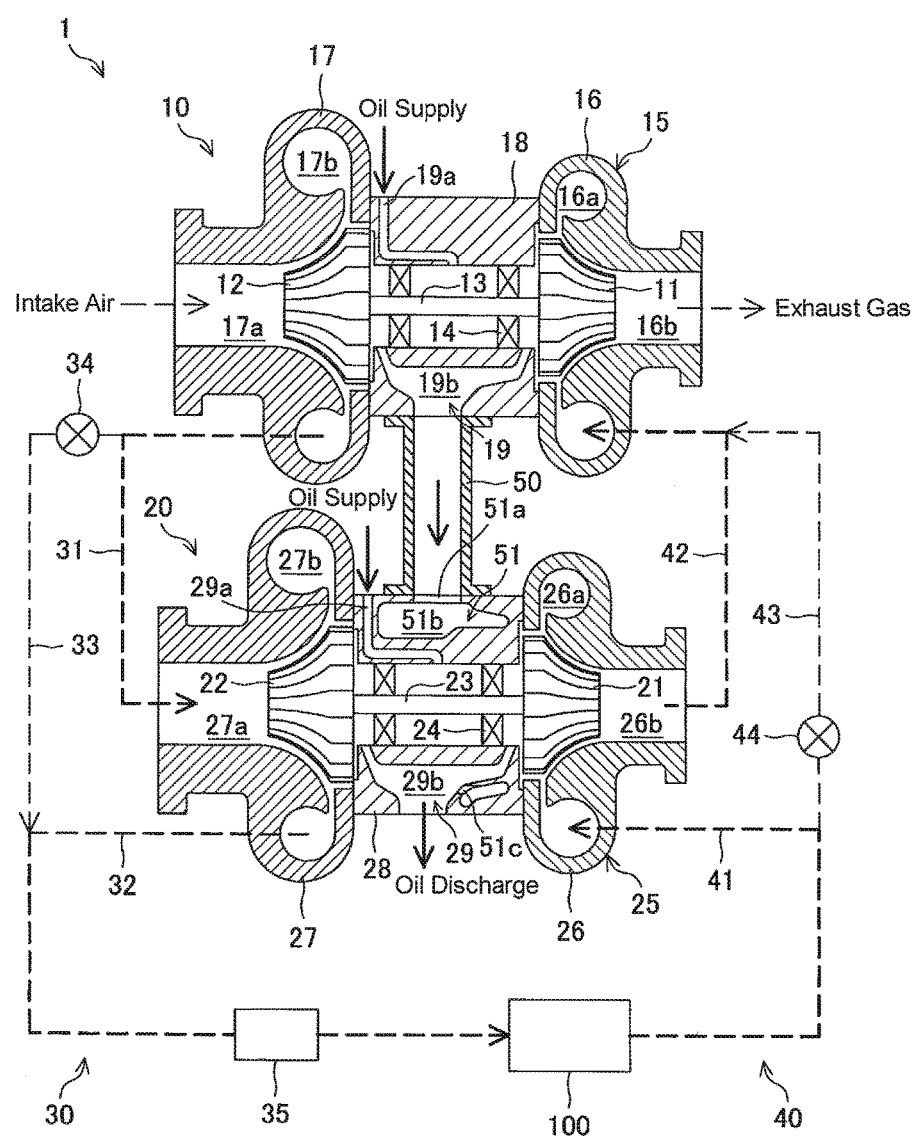
FIG. 1 is a partial, cross-sectional view schematically showing the structure of one embodiment of a forced induction apparatus.

One embodiment of a forced induction apparatus will now be described with reference to the drawings. FIG. 1 shows a forced induction apparatus 1 serving as a multistage forced induction apparatus that includes forced induction devices 10 and 20 arranged in series (or sequentially). However, the present invention is not limited to a multistage forced induction apparatus including forced induction devices that are arranged in series and may be applied to a forced induction apparatus including forced induction devices that are arranged in parallel.

Structure of Forced Induction Apparatus

The forced induction apparatus 1 is applied to an engine 100 installed in a vehicle. The forced induction apparatus 1 includes a large-volume high-speed turbocharger 10 that mainly functions when the vehicle is driven at a high speed and a small-volume low-speed turbocharger 20 that mainly functions when the vehicle is driven at a low speed. The high-speed turbocharger 10 and the low-speed turbocharger 20 are arranged next to each other in the vertical direction (up-down direction), and the low-speed turbocharger 20 is located below the high-speed turbocharger 10. That is, the high-speed turbocharger 10 corresponds to a "first forced induction device," and the low-speed turbocharger 20 corresponds to a "second forced induction device."

The high-speed turbocharger 10 includes a turbine 11 that is rotated and driven by exhaust gas, a compressor 12 that compresses intake air, a shaft 13 that couples the turbine 11 to the compressor 12, bearings 14 (first bearings) that rotationally support the shaft 13, and a housing 15 that accommodates the turbine 11, the compressor 12, the shaft 13, and the bearings 14.

The housing 15 includes a turbine housing member 16 that accommodates the turbine 11, a compressor housing member 17 that accommodates the compressor 12, and a cylindrical bearing housing member 18 that accommodates the bearings 14. The bearing housing member 18 is located at a middle portion of the housing 15. The turbine housing member 16 is coupled to one end (right side in FIG. 1) of the bearing housing member 18. The compressor housing member 17 is coupled to the other end (left side in FIG. 1) of the bearing housing member 18.

The turbine housing member 16 includes an annular supply port 16a, which is located at the radially outer side of the turbine 11, and a cylindrical discharge port 16b, which is located at the axially outer side of the turbine 11. Exhaust gas is supplied to the turbine 11 through the supply port 16a. The exhaust gas that has been used to drive the turbine 11 is discharged from the discharge port 16b. Further, the compressor housing member 17 includes a cylindrical supply port 17a, which is located at the axially outer side of the compressor 12, and an annular discharge port 17b, which is located at the radially outer side of the compressor 12. Intake air is supplied to the compressor 12 through the supply port 17a. The intake air that has been compressed by the compressor 12 is discharged from the discharge port 17b.

The low-speed turbocharger 20 has generally the same structure as the high-speed turbocharger 10. The low-speed turbocharger 20 includes a turbine 21 that is rotated and driven by exhaust gas, a compressor 22 that compresses intake air, a shaft 23 that couples the turbine 21 to the compressor 22, bearings 24 (second bearings) that rotationally support the shaft 23, and a housing 25 that accommodates the turbine 21, the compressor 22, the shaft 23, and the bearings 24.

The housing 25 includes a turbine housing member 26 that accommodates the turbine 21, a compressor housing member 27 that accommodates the compressor 22, and a cylindrical bearing housing member 28 that accommodates the bearings 24. The bearing housing member 28 is located at a middle portion of the housing 25. The turbine housing member 26 is coupled to one end (right side in FIG. 1) of the bearing housing member 28. The compressor housing member 27 is coupled to the other end (left side in FIG. 1) of the bearing housing member 28.

The turbine housing member 26 includes an annular supply port 26a, which is located at the radially outer side of the turbine 21, and a cylindrical discharge port 26b, which is located at the axially outer side of the turbine 21. Exhaust gas is supplied to the turbine 21 through the supply port 26a. The exhaust gas that has been used to drive the turbine 21 is discharged from the discharge port 26b. Further, the compressor housing member 27 includes a cylindrical supply port 27a, which is located at the axially outer side of the compressor 22, and an annular discharge port 27b, which is located at the radially outer side of the compressor 22. Intake air is supplied to the compressor 22 through the supply port 27a. The intake air that has been compressed by the compressor 22 is discharged from the discharge port 27b.

An intake passage 30 connects an intake manifold of the engine 100 to the high-speed turbocharger 10 and the low-speed turbocharger 20. Further, an exhaust passage 40 connects an exhaust manifold of the engine 100 to the high-speed turbocharger 10 and the low-speed turbocharger 20.

The intake passage 30 includes a first intake passage 31 (shown by thick broken line in FIG. 1), a second intake passage 32 (shown by thick broken line in FIG. 1), and a bypass intake passage 33 (shown by thin broken line in FIG. 1). The first intake passage 31 connects the discharge port 17b of the high-speed turbocharger 10 to the supply port 27a of the low-speed turbocharger 20. The second intake passage 32 connects the discharge port 27b of the low-speed turbocharger 20 to the intake manifold of the engine 100. The bypass intake passage 33 branches from the first intake passage 31, connects to the second intake passage 32, and bypasses the low-speed turbocharger 20. The bypass intake passage 33 includes an intake switch valve 34 for switching between states in which intake air is circulated and intake air is not circulated. Further, an intercooler 35 that cools intake air is located at a downstream side of where the second intake passage 32 connects to the bypass intake passage 33.

The exhaust passage 40 includes a first exhaust passage 41 (shown by thick broken line in FIG. 1), a second exhaust passage 42 (shown by thick broken line in FIG. 1), and a bypass exhaust passage 43 (shown by thin broken line in FIG. 1). The first exhaust passage 41 connects the exhaust manifold of the engine 100 to the supply port 26a of the low-speed turbocharger 20. The second exhaust passage 42 connects the discharge port 26b of the low-speed turbocharger 20 to the supply port 16a of the high-speed turbocharger 10. The bypass exhaust passage 43 branches from the first exhaust passage 41, connects to the second exhaust passage 42, and bypasses the low-speed turbocharger 20. The bypass exhaust passage 43 includes an exhaust switch valve 44 for switching between states in which exhaust gas is circulated and exhaust gas is not circulated.

Operation of Forced Induction Apparatus

In the above forced induction apparatus 1, the intake switch valve 34 and the exhaust switch valve 44 are closed when the vehicle is driven at a low speed. As a result, exhaust gas flows from the engine 100 to the low-speed turbocharger 20 and does not flow through the bypass exhaust passage 43. Thus, the energy of the exhaust gas first drives the low-speed turbocharger 20 and then drives the high-speed turbocharger 10. Further, since the bypass intake passage 33 is closed, the intake air that has been pressurized by the high-speed turbocharger 10 is pressurized again by the low-speed turbocharger 20. However, the high-speed turbocharger 10 has a large volume. Thus, the intake air is only slightly pressurized by the high-speed turbocharger 10 and mainly pressurized by the low-speed turbocharger 20 when the vehicle is driven at a low speed.

When the vehicle is driven at a high speed, the intake switch valve 34 and the exhaust switch valve 44 is open. As a result, most of the exhaust gas from the engine 100 flows through the bypass exhaust passage 43 and directly to the high-speed turbocharger 10. Thus, the energy of the exhaust gas is mainly consumed to drive the high-speed turbocharger 10. Further, since the bypass intake passage 33 is open, most of the intake air pressurized by the high-speed turbocharger 10 is supplied through the bypass intake passage 33 directly to the engine 100. This limits pressure reduction that would be caused by pressure loss that occurs when the intake air pressurized by the high-speed turbocharger 10 flows to the small-volume low-speed turbocharger 20.

Structure of Oil Passage

The bearings 14 and 24 respectively arranged in the turbochargers 10 and 20 need to be supplied with oil for lubrication and cooling. Thus, the housings 15 and 25 (more specifically, bearing housing members 18 and 28) of the turbochargers 10 and 20 include oil passages 19 and 29 passing by the bearings 14 and 24, respectively.

The oil passage 19 in the bearing housing member 18 of the high-speed turbocharger 10 includes an oil supply passage 19a and an oil discharge passage 19b. The oil supply passage 19a supplies the bearing 14 with oil that is pumped from an oil pan (not shown) and has a higher pressure than atmospheric pressure. The oil discharge passage 19b discharges the oil from the bearings 14 out of the high-speed turbocharger 10. When passing by the bearings 14, the pressure of the pumped oil that is higher than the atmospheric pressure decreases to a pressure that is close to the atmospheric pressure. In the same manner, the oil passage 29 in the bearing housing member 28 of the low-speed turbocharger 20 includes an oil supply passage 29a and an oil discharge passage 29b. The oil supply passage 29a supplies the bearing 24 with oil that is pumped from an oil pan (not shown) and has a higher pressure than atmospheric pressure. The oil discharge passage 29b discharges the oil from the bearings 24 out of the low-speed turbocharger 20. When passing by the bearings 24, the pressure of the pumped oil that is higher than the atmospheric pressure decreases to a pressure that is close to the atmospheric pressure.

The low-speed turbocharger 20, which is located at the lower side of the high-speed turbocharger 10, is configured so that the oil discharged from the oil passage 29 (oil discharge passage 29b) flows through a drain pipe (not shown), which is connected to an outlet of the oil passage 29, ultimately back to the oil pan. The use of a drain pipe for the high-speed turbocharger 10 would also increase the oil discharging efficiency of the high-speed turbocharger 10. However, there is not enough space between the high-speed turbocharger 10 and the low-speed turbocharger 20 for a drain pipe used by the upper high-speed turbocharger 10.

In the present embodiment, an outlet of the oil passage 19 in the high-speed turbocharger 10 is in communication with an inlet of a drain passage 51 formed in the low-speed turbocharger 20 through a communication passage 50 extending between the two turbochargers 10 and 20. Thus, there is no need to use a drain pipe for the high-speed turbocharger 10 as long as the communication passage 50 extends between the high-speed turbocharger 10 and the low-speed turbocharger 20. In such a case, even when the space is narrow between the high-speed turbocharger 10 and the low-speed turbocharger 20, the oil discharging efficiency of the high-speed turbocharger 10 is increased. The communication passage 50 of the present embodiment is configured mainly by a pipe or the like extending in the vertical direction. An upper end of the communication passage 50 is connected to the outlet of the oil passage 19, and a lower end of the communication passage 50 is connected to the inlet of the drain passage 51. The communication passage 50 of the present embodiment does not have to extend in the vertical direction and only needs to extend downward.

The drain passage 51 will now be described in detail. The drain passage 51 is formed in the housing 25 (bearing housing member 28) of the low-speed turbocharger 20. The drain passage 51 includes an entrance passage 51a, an annular passage 51b, and a connection passage 51c (refer to FIG. 2). The communication passage 50 is connected to the entrance passage 51a. The annular passage 51b, which is in communication with the entrance passage 51a, extends around the bearings 24. The connection passage 51c connects a lower portion of the annular passage 51b to the oil passage 29 (oil discharge passage 29b). That is, the drain passage 51 is located inside the low-speed turbocharger 20 and is separate from the oil passage 29. The drain passage 51 connects to the oil passage 29 (oil discharge passage 29b) at the downstream side of the bearings 24 with respect to the direction in which oil flows. The pressure of oil in the annular passage 51b and the oil discharge passage 29b is close to atmospheric pressure.

Figure 2:
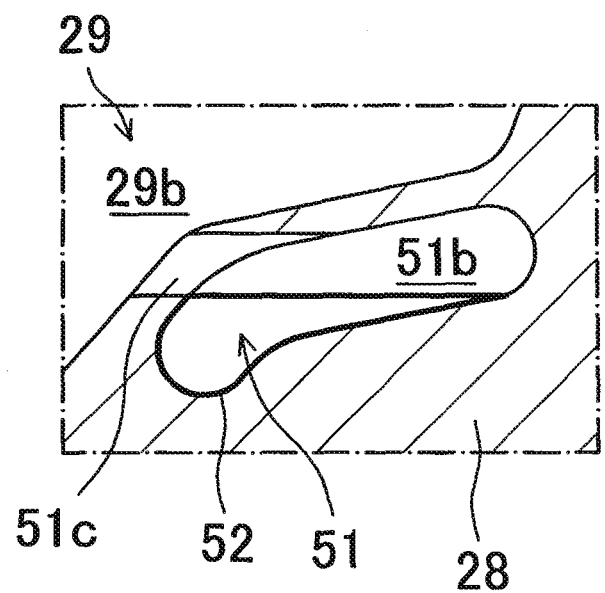
FIG. 2 is a partially enlarged view of a low-speed turbocharger in the forced induction apparatus shown in FIG. 1.

As shown in the partially enlarged view of FIG. 2, the connection passage 51c, which substantially extends in the horizontal direction, is connected to the lower portion of the annular passage 51b of the drain passage 51 and located at a higher position than the lower end of the annular passage 51b. Thus, the region of the annular passage 51b located below the connection passage 51c, more specifically, the region of the annular passage 51b located below the portion to which the connection passage 51c is connected (portion surrounded by thick line in FIG. 2), functions as a reservoir 52. The reservoir 52 stores oil even if oil is not being circulated when the engine 100 is stopped. The connection passage 51c does not necessarily have to be inclined in the substantially horizontal direction and may be inclined in the vertical direction as long as the connection passage 51c is in communication with the annular passage 51b and the oil discharge passage 29b.

Advantages

In the forced induction apparatus 1 of the present embodiment, the drain passage 51, which is in communication with the oil passage 19 (first oil passage) in the high-speed turbocharger 10 (first forced induction device), is arranged inside the low-speed turbocharger 20 (second forced induction device), which is located below the high-speed turbocharger 10. Since the drain passage 51 is located below the oil passage 19, the oil discharged from the high-speed turbocharger 10 is smoothly discharged through the drain passage 51 and out of the low-speed turbocharger 20. Further, the drain passage 51 is arranged inside the low-speed turbocharger 20. Thus, there is no need for a wide space between the high-speed turbocharger 10 and the low-speed turbocharger 20. This increases the oil discharging efficiency of the high-speed turbocharger 10 without adversely affecting the mountability of the forced induction apparatus 1.

Further, the oil discharged from the high-speed turbocharger 10 to the drain passage 51 in the low-speed turbocharger 20 can be used as a cooling medium. In particular, the load on the low-speed turbocharger 20 is relatively small. Thus, the arrangement of the low-speed turbocharger 20 at the lower side as described in the present embodiment relatively increases the cooling effect of the oil. When the cooling effect of oil is sufficiently high, there is no need to supply the low-speed turbocharger 20 with coolant that is used for cooling in the prior art. In such a case, the passage used to supply coolant in the prior art may be used as the drain passage 51.

In addition, in the present embodiment, the drain passage 51 connects to the oil passage 29 (second oil passage) at the downstream side of the bearings 24 (second bearings) with respect to the direction in which oil flows. Thus, the oil discharged from the high-speed turbocharger 10 flows through the drain passage 51 to the oil passage 29 and is then discharged out of the low-speed turbocharger 20. This eliminates the need to connect a separate drain pipe to the drain passage 51. Thus, the number of components can be decreased, and the mountability of the forced induction apparatus 1 can be increased.

Additionally, in the present embodiment, the drain passage 51 includes the reservoir 52 that stores oil. During dead soak after the engine 100 is stopped, the heat of the exhaust system may thermally damage the bearings 24 and the like. However, when oil is stored in the reservoir 52, the oil increases the heat capacity of the exhaust system accordingly. This reduces the influence of heat on the bearings 24 and the like.

Other Embodiments

It should be apparent to those skilled in the art that the present invention may be embodied in many other specific forms without departing from the spirit or scope of the invention. Particularly, it should be understood that the present invention may be embodied in the following forms.

For example, in the above embodiment, the high-speed turbocharger 10 is used as the first forced induction device, and the low-speed turbocharger 20 is used as the second forced induction device. Instead, the low-speed turbocharger may be used as the first forced induction device, and the high-speed turbocharger may be used as the second forced induction device.

Further, in the above embodiment, the drain passage 51 connects to the oil passage 29 at the downstream side of the bearings 24 in the direction in which oil flows, that is, the drain passage 51 connects to the oil discharge passage 29b. Instead, the drain passage 51 may connect to the oil passage 29 in the space where the bearings 24 are arranged. However, in such a case, oil having a pressure close to atmospheric pressure and flowing through the drain passage 51 would be apt to diffuse when the shaft 23 rotates, and the oil will collect on the turbine 21 and the compressor 22. Thus, it is preferred that the drain passage 51 connect to the oil passage 29 at the downstream side of the bearings 24 like in the above embodiment. If the drain passage 51 connects to the oil passage 29 at the upstream side of the bearing 24, that is, if the drain passage 51 connects to the oil supply passage 29a, high-pressure oil would flow from the oil supply passage 29a to the drain passage 51. This will reduce the pressure of the oil supplied to the bearings 24. Thus, such a structure is not preferred.

In addition, the drain passage 51 does not have to connect to the oil passage 29. Separate drain pipes may be connected to the drain passage 51 and the oil passage 29 so that oil flows through different routes to the oil pan. Alternatively, a drain pipe connected to the drain passage 51 may connect to a drain pipe connected to the oil passage 29 at the outside of the low-speed turbocharger 20.

Additionally, in the above embodiment, the oil passage 19 in the high-speed turbocharger 10 is in communication with the drain passage 51 in the low-speed turbocharger 20 through the communication passage 50. Instead, the outlet of the oil passage 19 may be directly connected to the inlet of the drain passage 51.

Therefore, the present examples and embodiments are to be considered as illustrative and not restrictive and the invention is not to be limited to the details given herein, but may be modified within the scope and equivalence of the appended claims.

The invention claimed is:

1. A forced induction apparatus for an engine comprising:
a first forced induction device including a first bearing and a first oil passage that passes by the first bearing; and
a second forced induction device including a second bearing, a second oil passage that passes by the second bearing, and a drain passage that is in communication with the first oil passage, wherein the second forced induction device is located below the first forced induction device, and the drain passage receives oil from the first oil passage and discharges the oil out of the second forced induction device, wherein
the first oil passage receives oil that is pumped from an oil pan without passing through the second forced induction device, and
the second oil passage receives oil that is pumped from the oil pan without passing through the first forced induction device.

2. The forced induction apparatus according to claim 1, wherein the drain passage connects to the second oil passage at a downstream side of the second bearing with respect to a direction in which oil flows.

3. The forced induction apparatus according to claim 1, wherein the drain passage includes a reservoir that stores oil.

4. The forced induction apparatus according to claim 3, wherein the drain passage includes a connection passage connected to the second oil passage, and wherein the drain passage includes a region located below a portion of the drain passage connected to the connection passage, and the region functions as the reservoir.

5. The forced induction apparatus according to claim 1, wherein
the first oil passage includes an outlet located in the first forced induction device,
the drain passage includes an inlet located in the second forced induction device; and
the outlet of the first oil passage is connected to the inlet of the drain passage directly or through a communication passage extending from the first forced induction device to the second forced induction device.

6. A forced induction apparatus for an engine comprising:
a first forced induction device including a first bearing and a first oil passage that passes by the first bearing; and
a second forced induction device including a second bearing, a second oil passage that passes by the second bearing, and a drain passage that is in communication with the first oil passage, wherein the second forced induction device is located below the first forced induction device, and the drain passage receives oil from the first oil passage and discharges the oil out of the second forced induction device, wherein
the drain passage includes a reservoir that stores oil and further includes a connection passage connected to the second oil passage, the reservoir being a region located below a portion of the drain passage connected to the connection passage.

7. The forced induction apparatus according to claim 6, wherein the drain passage connects to the second oil passage at a downstream side of the second bearing with respect to a direction in which oil flows.

8. The forced induction apparatus according to claim 6, wherein
the first oil passage includes an outlet located in the first forced induction device,
the drain passage includes an inlet located in the second forced induction device; and
the outlet of the first oil passage is connected to the inlet of the drain passage directly or through a communication passage extending from the first forced induction device to the second forced induction device.

9. The forced induction apparatus according to claim 6, wherein the drain passage receives oil from the first oil passage and discharges the oil out of the second forced induction device via the second oil passage.

* * * * *